(12) United States Patent
Wienand et al.

(10) Patent No.: US 8,295,585 B2
(45) Date of Patent: Oct. 23, 2012

(54) METHOD FOR DETERMINING THE POSITION OF AN OBJECT IN SPACE

(75) Inventors: Stephan Wienand, Zwingenberg (DE); Georg Lambert, Darmstadt (DE)

(73) Assignee: ISRA Vision Systems AG, Darmstadt (DE)

( * ) Notice: Subject to any disclaimer, the term of this patent is extended or adjusted under 35 U.S.C. 154(b) by 1227 days.

(21) Appl. No.: 10/588,184

(22) PCT Filed: Feb. 1, 2005

(86) PCT No.: PCT/EP2005/000971
§ 371 (c)(1),
(2), (4) Date: Mar. 17, 2008

(87) PCT Pub. No.: WO2005/075936
PCT Pub. Date: Aug. 18, 2005

(65) Prior Publication Data
US 2008/0192263 A1    Aug. 14, 2008

(30) Foreign Application Priority Data
Feb. 3, 2004   (DE) .......................... 10 2004 005 380

(51) Int. Cl.
| | | |
|---|---|---|
| G06K 9/00 | (2006.01) | |
| H04N 5/225 | (2006.01) | |
| G06T 15/00 | (2011.01) | |
| G06T 15/10 | (2011.01) | |
| G06T 15/30 | (2011.01) | |
| G06T 15/40 | (2011.01) | |
| G06T 15/50 | (2011.01) | |
| G06T 15/60 | (2006.01) | |
| G06T 17/00 | (2006.01) | |
| G06T 17/20 | (2006.01) | |
| G01C 3/14 | (2006.01) | |

(52) U.S. Cl. ........ 382/151; 382/103; 382/106; 382/154; 348/169; 345/419; 356/12

(58) Field of Classification Search ................... None
See application file for complete search history.

(56) References Cited

U.S. PATENT DOCUMENTS
4,942,539 A   7/1990   McGee et al.
(Continued)

FOREIGN PATENT DOCUMENTS
DE    33 02 177    8/1983
(Continued)

OTHER PUBLICATIONS
JP Abstract 04370704 Published Dec. 24, 1992 (English Abstract Only).

Primary Examiner — Randolph I Chu
(74) Attorney, Agent, or Firm — Michael J. Striker

(57) ABSTRACT

A method for determining the position of an object (1) in space is described, in which measurement characteristics (4) of the object (1) are recorded with an optical recording device (3) calibrated to a space coordinate system (5), and on the basis of these measurement characteristics (4), the position of the object (1) in the space coordinate system (5) is determined in an image processing device. To enable reliable ascertainment of the position even with only a few recording devices, it is provided that at least two measurement characteristics (4) of the object (1) are detected simultaneously in a recording device (3) and used to determine the position of the object (1).

10 Claims, 2 Drawing Sheets

U.S. PATENT DOCUMENTS

| | | |
|---|---|---|
| 5,388,059 A | 2/1995 | DeMenthon |
| 5,499,306 A | 3/1996 | Sasaki et al. |
| 5,856,844 A | 1/1999 | Batterman et al. |
| 6,044,183 A | 3/2000 | Pryor |
| 6,317,953 B1 | 11/2001 | Pryor |
| 6,415,043 B1* | 7/2002 | Josefsson .................. 382/103 |
| 6,671,058 B1 | 12/2003 | Braunecker et al. |
| 6,724,930 B1* | 4/2004 | Kosaka et al. ............. 382/154 |
| 6,806,905 B1* | 10/2004 | Morimoto et al. ....... 348/333.02 |
| 2001/0024512 A1* | 9/2001 | Yoronka et al. ............ 382/103 |
| 2003/0076293 A1* | 4/2003 | Mattsson .................... 345/156 |
| 2003/0144765 A1 | 7/2003 | Habibi et al. |
| 2004/0013295 A1* | 1/2004 | Sabe et al. .................. 382/153 |
| 2004/0122311 A1* | 6/2004 | Cosman ...................... 600/427 |

FOREIGN PATENT DOCUMENTS

| | | |
|---|---|---|
| DE | 198 12 609 | 10/1999 |
| DE | 100 26 711 | 12/2001 |
| DE | 101 11 720 | 9/2002 |
| DE | 101 11 729 | 9/2002 |
| DE | 101 59 574 | 4/2003 |
| EP | 0 911 603 | 4/1999 |
| WO | 93/07443 | 4/1993 |

* cited by examiner

METHOD FOR DETERMINING THE POSITION OF AN OBJECT IN SPACE

CROSS-REFERENCE

The invention described and claimed hereinbelow is also described in PCT/EP2005/000971, filed on Feb. 1, 2005, and DE 10 2004 005 380.4, filed on Feb. 3, 2004. This German Patent Application, whose subject matter is incorporated here by reference, provides the basis for a claim of priority of invention under 35 U.S.C. 119 (a)-(d).

A method for determining the position of an object in space is described, in which measurement characteristics of the object are recorded with an optical recording device calibrated to a space coordinate system, and on the basis of these measurement characteristics, the position of the object in the space coordinate system is determined in an image processing device. Such methods are employed for instance in production and assembly operations in automatic production lines, in which a work operation on a manufactured object of unknown position is to be performed using manipulating devices.

In European Patent Disclosure EP 0 911 603 B1, for optically determining the position of a rigid body in a three-dimensional coordinate system, it is described that each of a selection of at least three lines or edges present on the rigid body, the reference of which lines or edges to the coordinate system of the body itself is known, be reproduced in a two-dimensional coordinate system, in which the position of the two-dimensional coordinates is referred to the 3D coordinate system, and an allocation of marked points is dispensed with. As a rule, the edges or lines are detected by a plurality of cameras; it is also possible to use one camera that is movable in a controlled way with respect to the 3D coordinate system and to make a plurality of pictures of the lines or edges in succession.

However, this has the disadvantage that either a plurality of cameras must be used and calibrated separately, or that determining the position of the object in space is time-consuming, since a plurality of images must be made from different positions.

SUMMARY OF THE INVENTION

The object of the present invention is therefore to propose a possible way of determining the position of a body in space that allows the position of an object in space to be ascertained reliably with fewer cameras or camera positions.

To that end, at least two measurement characteristics of the object are detected simultaneously in a recording device and used to determine the position of the object. To that end, the measurement characteristics whose coordinates in their own coordinate system, particularly an object coordinate system, are known or can be ascertained by the image processor, are reproduced in a two-dimensional coordinate system of the recording device. Since the location, defined by the position and orientation, of the recording device in the space coordinate system is known along with its imaging properties, the image processor is able, using evaluation methods known per se, to establish a relationship between the measurement characteristics reproduced in the 2D coordinate system of the recording device and the space coordinate system. From the known relationship among the various measurement characteristics to one another in the object coordinate system, a conclusion can then be drawn about the location of the measurement characteristics in space that are recorded. This makes it possible to determine the position of the object in space. According to the invention, measurement characteristics can also be combined into a plurality of groups and detected in various partial measurements; the coordinates of the measurement characteristics in one group relative to one another are known, without the coordinates relative to measurement characteristics of other groups also being known. By combining the various partial measurements, the coordinates of the total body can be determined with increased accuracy.

Until now, it was assumed that the optical axes of the measuring instruments with which the various measurement characteristics were recorded for determining positions, had to be oriented differently in space in order to enable arriving at mathematically stable solutions to the evaluation algorithms. This required that each measurement characteristic used to determine the position of the object in space be recorded from a different camera position. This was achieved either by many cameras, set up at different sites and each calibrated, and meant correspondingly high expense for equipment. Alternatively, the camera could be moved successively and in a controlled way into various recording positions. However, that led to comparatively slow position determination, since all the images had to be evaluated in succession. With the present invention, it has now been found that it is possible to detect a plurality of measurement characteristics simultaneously with one camera and to use them for determining the position in space. As a result, the speed of determining the position of an object in space is increased considerably. This is especially advantageous if the various measurement characteristics on the object that are detected in one camera have a pronounced spacing that in particular is as great as possible. The attainable accuracy depends especially on the spacing of the measurement characteristics on the object. Depending on the accuracy desired, a defined spacing can be specified as a minimum spacing between two measurement characteristics. If the demands for accuracy are not so stringent, however, the method of the invention can also be performed with measurement characteristics located close together.

If the location of an object in space, that is, its position and orientation, is to be ascertained accurately, all six degrees of freedom of the object must be determined. This can be achieved according to the invention by evaluating at least three characteristics from at least one recorded image. Determining the position and orientation of an object is accordingly possible by evaluating three measurement characteristics, which are identifiable in one or more pictures. It is especially advantageous if all the measurement characteristics required for the evaluation are detected with a single picture. However, it is also possible according to the invention to detect for instance one of the three required measurement characteristics using a second recording device or to detect a second recording position of the one recording device. By combining at least two characteristics in one recording device, a considerable improvement in terms of the expense for equipment and/or the evaluation speed is already achieved.

With only three measurement characteristics, however, no residual error can be determined. If four or more measurement characteristics are employed, it is additionally possible to determine a residual error after an error correction calculation. The residual error characterizes the error between the modelled geometry and reality and is therefore a standard for the accuracy achieved. According to the invention, however, it is advantageous if to detect no more than five measurement characteristics simultaneously with one recording device. Although the residual error decreases with the number of measurement characteristics, it has been demonstrated that evaluating more than five measurement characteristics in one image, using the known evaluation methods, does not lead to further significant improvement in terms of error. To avoid unnecessary evaluation work, it is therefore possible to do without a relatively high number of measurement characteristics to be evaluated in one image of a recording device.

Depending on the intended application, it is possible or sufficient to perform the determination of the position of the object using fewer than six degrees of freedom. Arbitrary subsets are possible. In a two- or one-dimensional measurement finding, the number of measurement characteristics required can be reduced to two or one, respectively, because of the reduced number of degrees of freedom. In principle, it is possible to determine the position of the object in from six degrees of freedom to only one degree of freedom. Determining five and six degrees of freedom is possible by means of at least three measurement characteristics; determining three and four degrees of freedom is possible by means of at least two measurement characteristics; and determining one and two degrees of freedom is possible by means of at least one measurement characteristic. Detecting only one measurement characteristic in one recording device can also be done with a recording and evaluation system of the invention that is arranged for performing the method of the invention.

In one feature of the method of the invention, the measurement characteristics are in particular marked points, that is, pointlike characteristics that themselves have no orientation in space. Such an orientation of the measurement characteristics in space, in contrast to many methods known from the prior art, is not necessary for the use of the method of the invention, and in comparison to edges for instance offers the advantage that the position of a marked point in space is always unambiguous. With an edge of some other geometric contour, conversely, it is initially not known which point of the edge is being accurately detected. The method of the invention can equally well be employed with measurement characteristics which are embodied as edges (mathematical curves or straight lines) or other describable geometric forms; in that case, the evaluation expenditure is increased. In the case of an edge, the angle of the edge in space can be used as an additional peripheral condition, in order to increase the sturdiness and stability of the mathematical solution model. The method can also be employed according to the invention in contour evaluation using arbitrarily many points.

Although the method can be well performed with only a single recording device, according to the invention it is also possible for a plurality of recording devices to be employed. Both the number and the location of recording devices involved in the measurement can be made dependent on the extent and geometry of the object to be measured and on the required accuracy of the measurement finding.

In an advantageous feature, a measurement characteristic can also be reproduced in a plurality of recording devices. This generally increases the accuracy of the overall result by the contribution of this measurement characteristic, since as a result, a not absolutely necessary overdetermination is achieved and is utilized to increase the accuracy.

To attain high flexibility, it is possible according to the invention to use one or more stationary and/or movable recording devices, the movable recording devices in particular being movable by means of a manipulating device. It is also possible for a plurality of cameras, fixedly connected to one another, to be located on one manipulating device. By using a manipulating device, it is also possible to put a recording device in various measurement positions in succession and to make images there. In these moving manipulating systems, the manipulating device must repeatedly approach the same positions in space, where the recordings are made, or must be able to ascertain the calibrated coordinates of its own position in space and transfer it to the image processor.

This can be done for instance by means of three-dimensional calibration of the recording device on the manipulating device, so that based on the controlled motion of the manipulating device, the position of the recording device on the manipulating device is known in every attainable state of motion. It is also possible to determine the position of the recording device automatically by measuring characteristics that have known coordinates and/or by using external measuring means. In particular, it is conceivable for the moving recording devices to be calibrated outside the actual measuring space in which the position of the object is to be determined, the calibration being done by placing a calibration medium outside this measurement space. To that end, the recording device to be calibrated can be moved by the manipulating device in such a way that the calibrating medium is reproduced by the recording device. From the known position of the calibrating medium, the position of the recording device can then be ascertained and its calibration can be performed. This has the advantage that the object to be measured need not be detached before the calibration. Because of the above-described, especially advantageous calibration options, it is attained that for a movable recording device after a motion of the manipulating device, the position of the recording device is determined in the space coordinate system. The method of the invention is independent of the calibration method, however, and can be employed with arbitrary calibrations.

In an advantageous variant of the invention, the recording device is positioned such that between visual rays which strike the recording device and originate at different measurement characteristics and are used to determined the position of the object, a large intermediate angle exists in each case. A large intermediate angle according to the invention exists whenever the visual rays originating at different measurement characteristics do not extend parallel or substantially parallel. Preferably, the recording device is positioned such that the intermediate angle, or as many intermediate angles as possible, is or are greater than approximately 10° each. This does not represent a sharp boundary, since the size of the intermediate angle determines the accuracy of the result. If the requirements for accuracy are suitably slight, even smaller angles of 5° to 6°, for instance, can therefore suffice. This is particularly true if only a few intermediate angles, for instance one or two intermediate angles, are smaller than the preferred intermediate angle of greater than approximately 8° to 10°. Corresponding angle limitations apply as the intermediate angles approach 180°. Even in that case, sufficient accuracy can still be attained. It has been found according to the invention that it is possible to detect a plurality of measurement characteristics with one camera and evaluate them with sufficient accuracy if the angles particularly between the individual visual rays, originating at these measurement characteristics, are sufficiently large. In that case, the various visual rays do not extend parallel, or do not extend substantially parallel. The attainable accuracy in determining the position becomes greater, the larger the intermediate angles between visual rays.

This is also true according to the invention for the case in which only one measurement characteristic in the one recording device is detected; then overall a plurality of recording positions are employed (a plurality of recording devices or a plurality of positions of one recording device in succession). Even in this case, the orientation of the optical axes of the recording device or recording devices at the recording positions is not decisive, as long as the visual rays, used for evaluation, of various measurement characteristics have sufficiently large intermediate angles. An independent aspect of the present invention is therefore directed to proposing a method for determining the position of an object in space in which measurement characteristics of the object are recorded with at least one optical recording device, calibrated to a space coordinate system, and on the basis of these measurement characteristics, the position of the object in the space coordinate system is determined in an image processing device. The recording device is positioned such that between visual rays that strike the one recording device or the plurality of recording devices, which visual rays originate at different measurement characteristics and are used to determine the position of the object, a large intermediate angle exists in each case.

In practice, as a rule, sufficient accuracies in position determination are attained if the intermediate angles between the visual rays are in particular in a range from approximately 10° to 170°. Depending on the particular application, however, a larger or smaller angular range may be appropriate.

Optimal accuracy is attained if, depending on the particular application, the recording device is positioned and/or arranged such that as large an intermediate angle as possible exists in each case. This can for instance be attained by adapting the recording distance and focal length of the lens of the recording device. To attain the largest possible angles between the visual rays, it is necessary to use short-focal-length lenses with wide opening angles. With wide-angle lenses of this kind in the recording device, which is formed for instance by a camera with a CCD sensor, there are wide variations in changes of scale and projective outlines of the object reproduction as a function of the object location and orientation, and this improves the measurement accuracy. The recording device is preferably placed so close to the object that the measurement characteristics used for the position determination are still just barely detected by the recording device. This makes optimal use of the sensitive area, such as a CCD chip, offered by the recording device.

It is decisive for the use of the method of the invention that the coordinates of the measurement characteristics, in the coordinates associated with the object to be measured, or in other words in the object coordinate system, are known for the image evaluation and/or can be ascertained by it. This can be attained according to the invention by providing that the object data are specified, for instance in the form of construction data, with the coordinates of the measurement characteristics of the image processor. In a further embodiment of the present invention, it is also possible for the coordinates of the measurement characteristics on the objects to be learned. To that end, the object, in a plurality of known positions, is recorded by the recording device. The recorded images are then evaluated accordingly, and the coordinates are assigned to the various measurement characteristics. The image processor can for instance detect all the possible measurement characteristics that are available on the object, so that for determining the position of the object in space, many different measurement characteristics are available.

In a further development of the method of the invention, the selection of measurement characteristics to be detected by a recording device, the position of the recording device, and/or the focal length of the recording device is determined automatically. This is especially attractive in the case of moving recording devices, since in them the image excerpt to be recorded from the object can be selected such that significant measurement characteristics, especially suitable for determining the position of the object, optimally cover the sensitive region of the recording device. To that end, the recording device can for instance make a test image of the object. In this test image, the image processor identifies the detectable measurement characteristics. By monitoring different recording positions and/or different measurement characteristics used for the evaluation, the optimal recording position can then be ascertained automatically. Optionally, the focal length of the lens of the recording device can additionally be adapted, if the focal length of the recording device is automatically adjustable.

Further advantages, characteristics and possible applications of the present invention will become apparent from the ensuing description of exemplary embodiments and of the drawings. All the characteristics described and/or shown in the drawings form the subject of the invention, regardless of how they are summarized in the claims and/or the claims dependencies.

BRIEF DESCRIPTION OF THE DRAWINGS

Shown are.

DETAILED DESCRIPTION OF THE PREFERRED EMBODIMENTS

Figure 1:
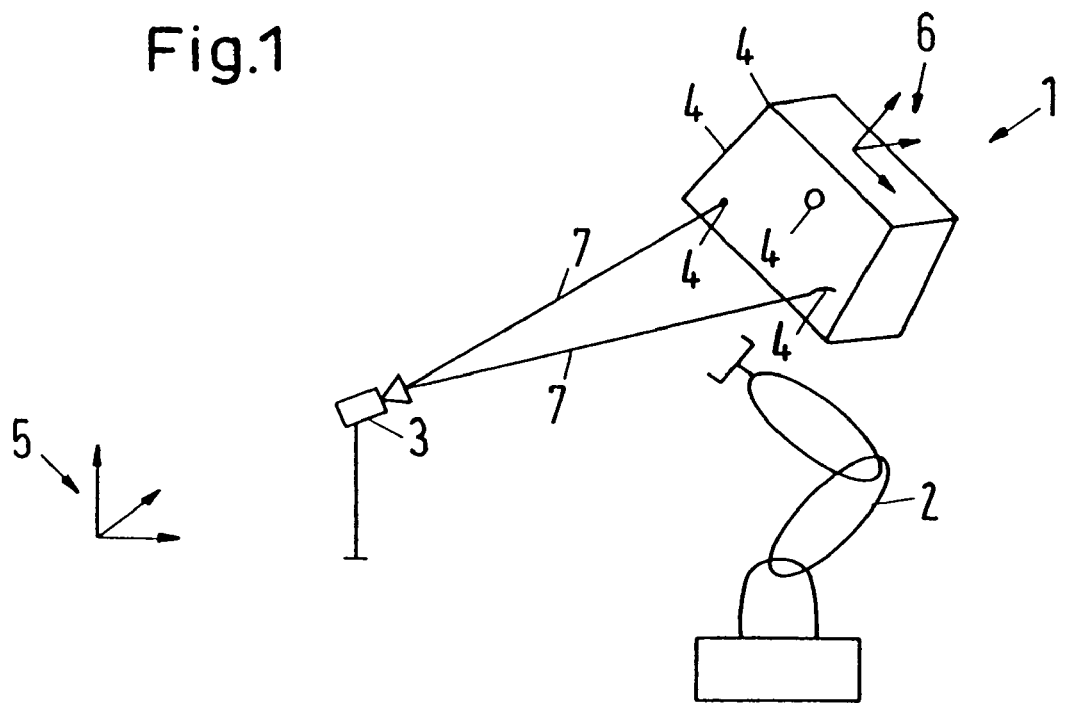
FIG. 1, schematically, the determination of the object position in a space coordinate system, with a stationary recording device.

In FIG. 1, a system according to the invention is shown, with which the method for determining the position of an object 1 in space according to the present invention can be performed. An object 1 is shown, whose position in space is to be determined. There is often a need for this in production and assembly operations in automated production lines in which the object 1 is positioned in space for instance by a conveyor belt or the like. The position of the object 1 is then unknown. The goal of position determination is usually to be able to perform an installation, gripping or machining process on a manufactured object 1 that is in an unknown position. Mounting must as a rule always take place at the same reference point on the object 1. To attain this, if the position of the object 1 is unknown, the object must be measured, and a manipulating device 2, which is meant to bring the part to be mounted to the object 1, must be made to track it in accordance with the measurement finding. The tasks to be performed on the object range among others from attaching components, such as inserting a door into a vehicle body, or intentionally applying material, such as adhesives or sealing material, to an object 1, to performing mounting motions on the object, such as screwing together connections, welding mechanically prepositioned partial objects, or the like. It may also be intended that the object be grasped in order to move it. However, the use of the method of the invention is not limited to these examples of its use; instead, it can be used in general in determining the position of an arbitrary body in space.

To determine the position of the object 1 in space, the object 1 is recorded with a recording device 3, such as an optical camera with a CCD sensor. In this process, the object 1 is reproduced with measurement characteristics 4 that are used for evaluating the position of the object 1 in space. These measurement characteristics 4 may be marked points, that is, point-shaped features that have no orientation in space. Geometric shapes, such as circles, lines, the focal point of a particularly defined region, corners or edges of the object, or other characteristics can be used that can be identified unambiguously in the picture made by the recording device 3. If the position of the object 1 in space is not known in six degrees of freedom, that is, with regard to position and orientation, then at least three measurement characteristics 4 which are spaced apart from one another on the object are used for the evaluation and are detected in the one recording device 3. In principle, however, it is also possible to provide a plurality of recording devices 3.

Recording the measurement characteristics 4 of the object 1 in the recording device 3 creates a two-dimensional copy of the object 1 that has the measurement characteristics 4. In an image processing device, not shown separately but connected to the recording device 3, the image made is then processed. Based on the three-dimensional calibration of the recording device 3 in the space coordinate system 5, which in particular uses the GPS coordinate system, and because of the known imaging properties of the recording device 3, defined points in space can be allocated to the measurement characteristics 4 of the object 1. Since the coordinates of the measurement characteristics 4 are simultaneously known relative to one another in the object coordinate system 6, the location of the object 1 can be ascertained accurately in terms of both the position and the orientation in space.

This information can be used to control the manipulating device 2 such that the object 1 is for instance moved to a predetermined position in space, or that items located on the manipulating device 2 that are to be mounted are now attached to the object 1 in accurate positions.

High accuracy can be attained, despite the evaluation of a plurality of measurement characteristics 4 in one recording device 3, whenever the evaluated measurement characteristics 4 are far enough apart on the object 1. In that case, the intermediate angles between visual rays 7 striking the individual measurement characteristics 4 in the recording device are also large enough, so that the mathematical evaluation algorithms furnish a stable position finding. The position of the recording device 3 is preferably selected such that as many visual rays 7 as possible, for the measurement characteristics 4 used for the evaluation, have the largest possible intermediate angle. It is advantageous if the intermediate angles between visual rays 7, for as many measurement characteristics as possible, are each larger than approximately 10°.

Figure 2:
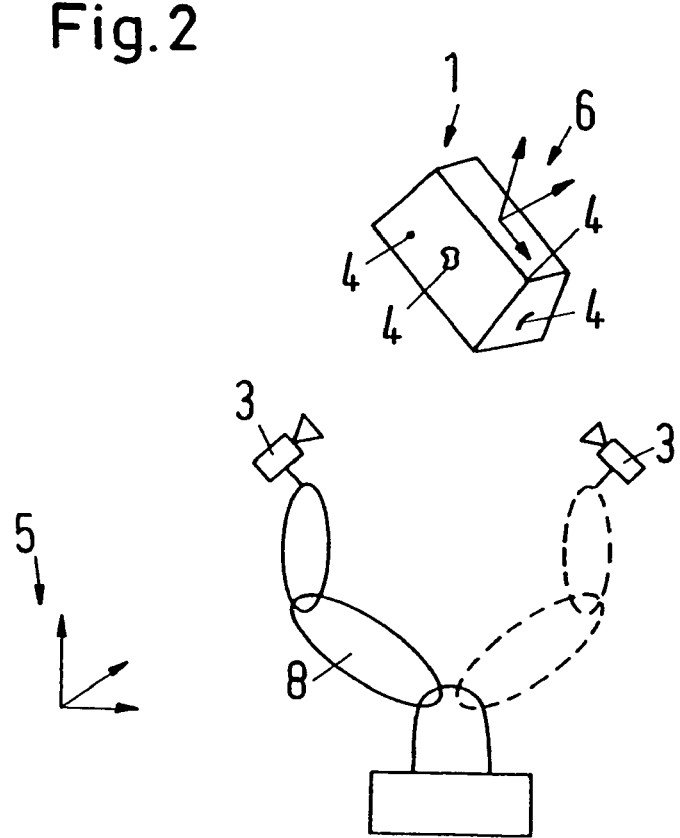
FIG. 2, schematically, the determination of the object position in a space coordinate system, with a moving camera.

FIG. 2 shows a comparable system for performing the method of the invention, in which the recording device 3 itself is attached to a manipulating device 8. In this case, in a first recording position of the recording device 3, which is represented by solid lines, some of the measurement characteristics 4 used for the evaluation are detected. After that, the recording device 3 is moved to a second recording position, which is shown in dashed lines. In this second recording position, further measurement characteristics 4 are recorded and are used for evaluating the position of the object 1 in space.

Figure 3:
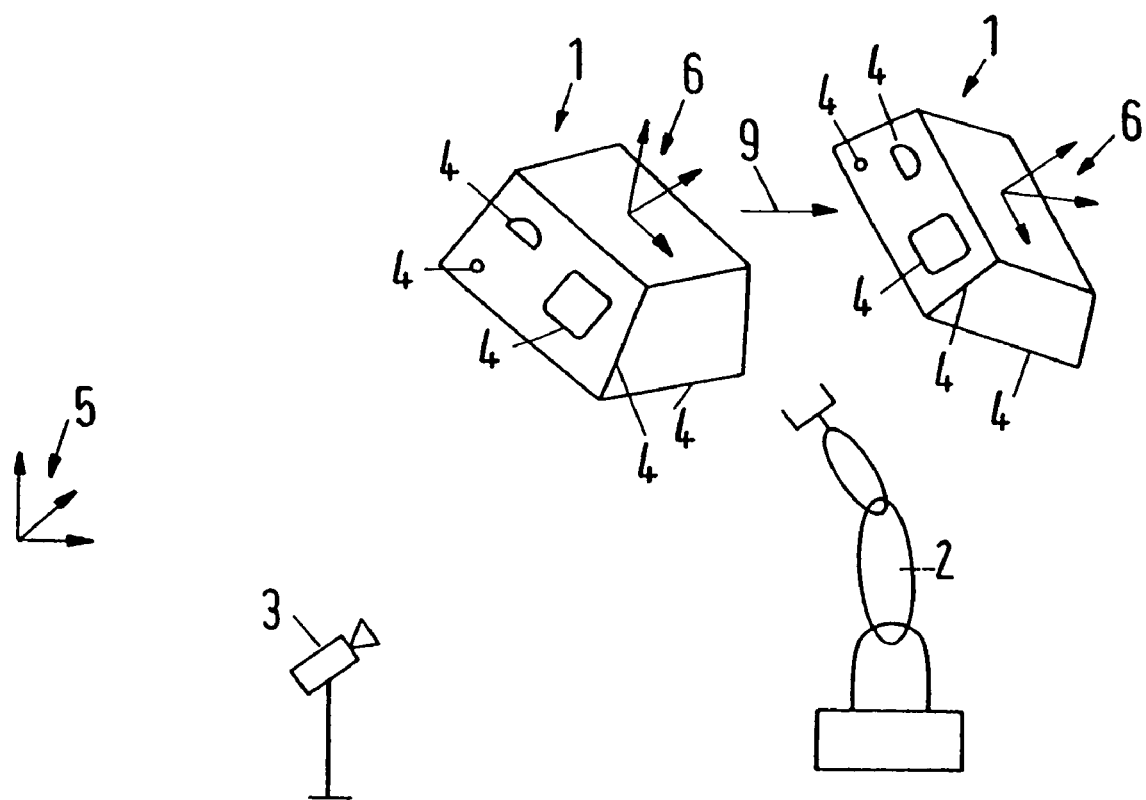
FIG. 3, schematically, the determination of the object position in a space coordinate system relative to a zero position of the object.

The method of the invention can also, as shown in FIG. 3, be used to detect the relative displacement 9 of an object 1 in space. The principle employed is the same as in the method variants described above. By means of a recording device 3, various measurement characteristics 4 of the object 1 in the various positions in space are detected and evaluated by means of an image processing device, not separately shown. By comparison of the various locations of the object 1 in space at various times, the location of the body relative to a zero position can then be ascertained.

The advantage of the method of the invention resides in particular in the fact that a plurality of measurement characteristics 4, preferably up to five measurement characteristics 4, can be detected and evaluated simultaneously in an evaluation device. This simplifies and speeds up the determination of the object location in space considerably in comparison to previously known methods.

LIST OF REFERENCE NUMERALS

1 Object
2 Manipulating device
3 Recording device
4 Measurement characteristic
5 Space coordinate system
6 Object coordinate system
7 Visual rays
8 Manipulating device
9 Relative displacement

The invention claimed is:

1. A method for determining the position and relative displacement of an object (1) in space, comprising the following steps:
   simultaneously recording at least three measurement characteristics (4) of the object (1) in an image by an optical recording device (3) calibrated to a space coordinate system (5); wherein the measurement characteristics are recorded in different space positions of the recording device
   on the basis of these measurement characteristics (4), determining the position of the object (1) in the space coordinate system (5) in an image processing device, wherein a moveable recording device is used, wherein the at least three measurement characteristics (4) of the object (1) in different spatial positions are recorded and evaluated, wherein a position of the recording device (3) is selected such that for determining the position of the object (1), suitable measurement characteristics (4) optimally cover a sensitive area of the recording device by intermediate angles of visual rays (7) from the measurement characteristics (4) to the photographic device (3) that are greater than 10°, and wherein no more than five measurement characteristics (4) are evaluated simultaneously.

2. The method as defined by claim 1, wherein the measurement characteristics (4) are marked points.

3. The method as defined by claim 1, wherein a plurality of recording devices (3) are used.

4. The method as defined by claim 1, wherein one measurement characteristic (4) is reproduced in a plurality of recording devices (3).

5. The method as defined by claim 1, wherein a stationary and/or movable recording device (3) is used.

6. The method as defined by claim 5, wherein for a movable recording device (3), after a motion, the position of the recording device (3) in the space coordinate system (5) is determined.

7. The method as defined by claim 1, wherein the intermediate angle is between 10° and approximately 170°.

8. The method as defined by claim 1, wherein the recording device (3) is positioned and/or arranged such that as large an intermediate angle as possible exists in each case.

9. The method as defined by claim 1, wherein before the method is employed, the coordinates of the measurement characteristics (4) are learned in an object coordinate system (6), in that the object (1) is recorded in a plurality of known positions by the recording device (3).

10. The method as defined by claim 1, wherein the selection of measurement characteristics to be detected by a recording device (3), the position of the recording device (3), and/or the focal length of the recording device (3) is determined automatically.

* * * * *